United States Patent
Seki

(10) Patent No.: US 11,888,521 B2
(45) Date of Patent: Jan. 30, 2024

(54) MASTER STATION DEVICE, SLAVE STATION DEVICE, AND WIRELESS COMMUNICATION SYSTEM

(71) Applicant: Panasonic Corporation, Osaka (JP)

(72) Inventor: Yuta Seki, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

(21) Appl. No.: 17/707,166

(22) Filed: Mar. 29, 2022

(65) Prior Publication Data

US 2022/0385366 A1 Dec. 1, 2022

(30) Foreign Application Priority Data

Jun. 1, 2021 (JP) ................................. 2021-092207

(51) Int. Cl.
*H04B 10/516* (2013.01)
*H04B 10/2575* (2013.01)

(52) U.S. Cl.
CPC ..... *H04B 10/25752* (2013.01); *H04B 10/516* (2013.01)

(58) Field of Classification Search
CPC .... H04B 10/2575–25759; H04B 10/516–5563
See application file for complete search history.

(56) References Cited

U.S. PATENT DOCUMENTS

| | | | |
|---|---|---|---|
| 11,290,316 B2* | 3/2022 | Ali Shah | H04L 27/0014 |
| 11,349,573 B1* | 5/2022 | Campos | H04B 10/501 |
| 2008/0192774 A1* | 8/2008 | Singh | H04L 1/1867 370/473 |
| 2014/0334417 A1 | 11/2014 | Aminaka et al. | |
| 2017/0250777 A1 | 8/2017 | Sarashina | |
| 2018/0359767 A1 | 12/2018 | Aminaka et al. | |
| 2021/0273747 A1* | 9/2021 | MacKenzie | H04W 28/0967 |
| 2021/0352526 A1* | 11/2021 | Kim | H04L 5/0053 |
| 2021/0391943 A1* | 12/2021 | Djordjevic | H04L 1/203 |

FOREIGN PATENT DOCUMENTS

| | | |
|---|---|---|
| JP | 2017-152990 A | 8/2017 |
| JP | 2018-170805 A | 11/2018 |
| WO | 2013/076901 A1 | 5/2013 |

OTHER PUBLICATIONS

CPRI Specification V7.0, "Common Public Radio Interface (CPRI); Interface Specification," Oct. 9, 2015 (128 pages).
eCPRI Specification V2.0, "Common Public Radio Interface: eCPRI Interface Specification," May 10, 2019 (109 pages).
Kobayashi et al., "Ultra high-speed optical communication technology combining digital signal processing and circuit technology," NTT Technical Journal, Mar. 2019, pp. 16-21 (with English translation).

(Continued)

*Primary Examiner* — Nathan M Cors

(74) *Attorney, Agent, or Firm* — Seed IP Law Group LLP

(57) ABSTRACT

A master station device includes a processor that outputs a subcarrier modulation signal, and a transmitter that maps an in-phase (I) component and a quadrature-phase (Q) component of the subcarrier modulation signal to an optical signal to be transmitted to a fronthaul.

10 Claims, 13 Drawing Sheets

(56) References Cited

OTHER PUBLICATIONS

Okumura et al., "The Research and Development Project for Realization of Fifth-generation Mobile Communication System—Research and Development for High Data Rate and Low-Power-Consumption Radio Access Technologies with Higher-Frequency-Band and Wider-Bandwidth Massive MIMO-," NTT Docomo, Inc., R & D to expand radio resources, 12 Results Presentation Meeting, 2012 (16 pages with English translation).

O-RAN Fronthaul Working Group, "Control, User and Synchronization Plane Specification," O-RAN Alliance, O-RAN.WG4.CUS.0-v5.00. Nov. 12, 2020 (291 pages).

Tsuboi et al., "Technical Features and Approaches on Optical Access Networks for Various Applications," IEICE Trans. Commun., vol. E100-B, No. 9, Sep. 2017, pp. 1606-1613.

Okumura et al., "The Research and Development Project for Realization of Fifth-generation Mobile Communication System—Research and Development for High Data Rate and Low-Power-Consumption Radio Access Technologies with Higher-Frequency-Band and Wider-Bandwidth Massive MIMO-," NTT Docomo, Inc., R & D to expand radio resources, 12 Results Presentation Meeting, 2012 (17 pages with English translation).

\* cited by examiner

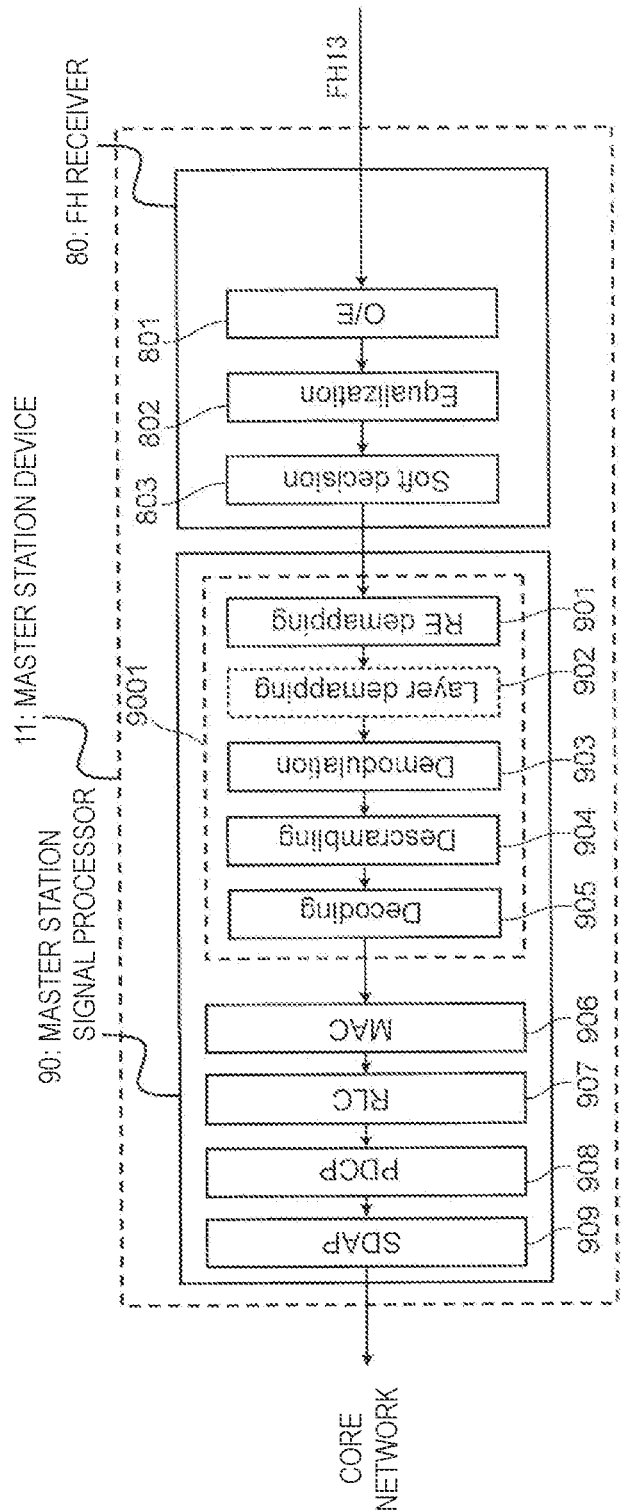

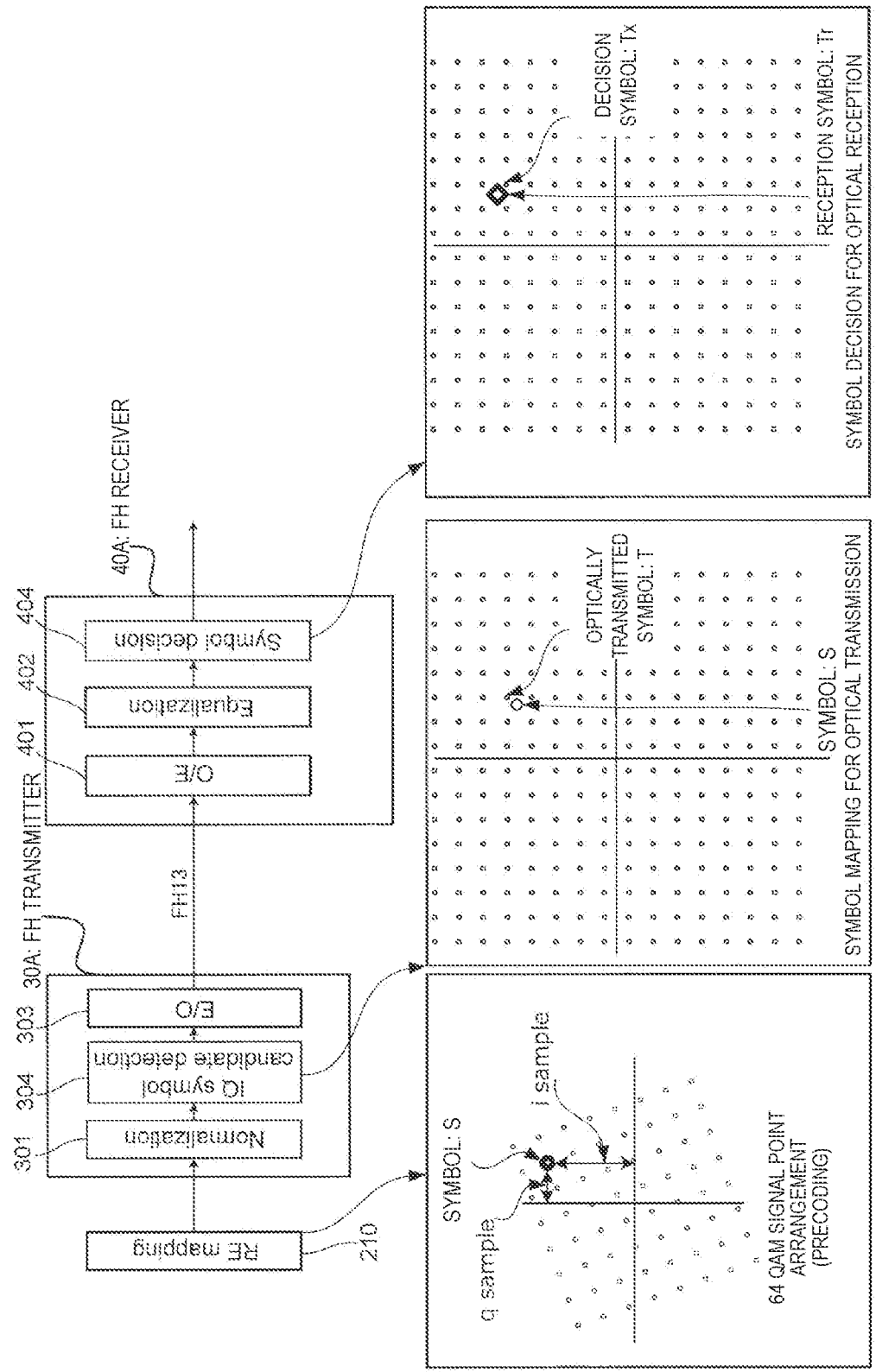

MASTER STATION DEVICE, SLAVE STATION DEVICE, AND WIRELESS COMMUNICATION SYSTEM

BACKGROUND

1. Technical Field

The present disclosure relates to a master station device, a slave station device, and a wireless communication system.

2. Description of the Related Art

In a wireless communication system, in order to flexibly design an area where wireless communication with a user terminal (user equipment [UE]) is available, a configuration can be adopted in which a radio base station is split into a master station device and a slave station device, and the slave station device is disposed at a different position from the master station device.

For example, the master station device connected to a core network has a baseband signal processing function of the radio base station, and one or more slave station devices are connected to the mater station device. The slave station device performs radio processing such as analog conversion and performs wireless communication with the UE.

SUMMARY

However, existing wireless communication system (for example, a radio base station) has room for consideration about transmission efficiency between the master station device and the slave station device (fronthaul).

One non-limiting and exemplary embodiment facilitates providing a master station device, a slave station device, and a wireless communication system capable of improving the transmission efficiency of the fronthaul.

A master station device according to an example of the present disclosure includes a processor that outputs a subcarrier modulation signal, and a transmitter that maps an in-phase (I) component and a quadrature-phase (Q) component of the subcarrier modulation signal in an optical signal to be transmitted to a fronthaul.

A slave station device according to an example of the present disclosure includes a receiver that receives the optical signal via the fronthaul, and a processor that identifies the subcarrier modulation signal based on the I component and the Q component of the subcarrier modulation signal mapped in the optical signal.

A wireless communication system according to an example of the present disclosure includes a master station device and a slave station device, the master station device including a processor that outputs a subcarrier modulation signal and a transmitter that maps an I component and a Q component of the subcarrier modulation signal in an optical signal to be transmitted to a fronthaul, the slave station device including a receiver that receives the optical signal via the fronthaul and a processor that identifies the subcarrier modulation signal based on the I component and the Q component of the subcarrier modulation signal mapped in the optical signal.

It should be noted that general or specific embodiments may be implemented as a system, a method, an integrated circuit, a computer program, a storage medium, or any selective combination thereof.

According to an example of the present disclosure, transmission efficiency of the fronthaul can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6B is a diagram illustrating an example of a configuration of the FH receiver and the master station signal processor illustrated in FIG. 5;

FIG. 8 is a diagram illustrating an example of IQ symbol candidate detection and symbol decision;

DETAILED DESCRIPTION

Hereinafter, exemplary embodiments will be described with reference to the drawings as appropriate. Note that a more detailed description than need may be omitted. For example, the detailed description of already well-known matters and the overlap description of substantially same configurations may be omitted. This is to avoid an unnecessarily redundant description below and to facilitate understanding of a person skilled in the art.

Note that the attached drawings and the following description are provided for those skilled in the art to fully understand the present disclosure, and are not intended to limit the subject matter described in the appended claims.

<Knowledge that LED to Present Disclosure>

In the existing technique (for example, Unexamined Japanese Patent Publication No. 2017-152990), a master station device may be referred to as a baseband unit (BBU), and a slave station device may be referred to as a remote radio head (RRH). For a connection between the master station device and the slave station device, for example, a wired transmission device (or a wired interface), such as a coaxial cable, an unshielded twisted pair (UTP) cable, a shielded twisted pair (STP) cable, or an optical fiber cable, is used. Such a connection between the master station device and the slave station device may be referred to as a "fronthaul connection" or simply a "fronthaul".

For example, a network configuration called a centralized-radio access network (C-RAN) is known. In this configuration, the master station device is disposed in an aggregation station building that performs centralized control of a system, and a slave station device is disposed in a distributed station building near an antenna site. In the C-RAN, centralized control can be performed in the aggregation station building, and interference can be avoided by performing cooperative operations in a plurality of different distributed station buildings.

In a regulation regarding a communication method of the fronthaul (FH) (for example, Common Public Radio Interface (eCPRI) Interface Specification V2.0 (2019-05-10)), the master station device is referred to as a radio equipment controller (REC), and the slave station device is referred to as a radio equipment (RE). Further, in 0-RAN.WG4.CUS.0-v05.00 that defines an Open Radio Access Network (O-RAN), the master station device is referred to as an O-RAN distributed unit (O-DU), and the slave station device is referred to as an O-RAN radio unit (O-RU).

For example, Unexamined Japanese Patent Publication No. 2017-152990 discloses a method for structuring a C-RAN by connecting a plurality of slave station devices (for example, RRHs) to a master station device (for example, a BBU) using a passive optical network (PON).

Figure 1:
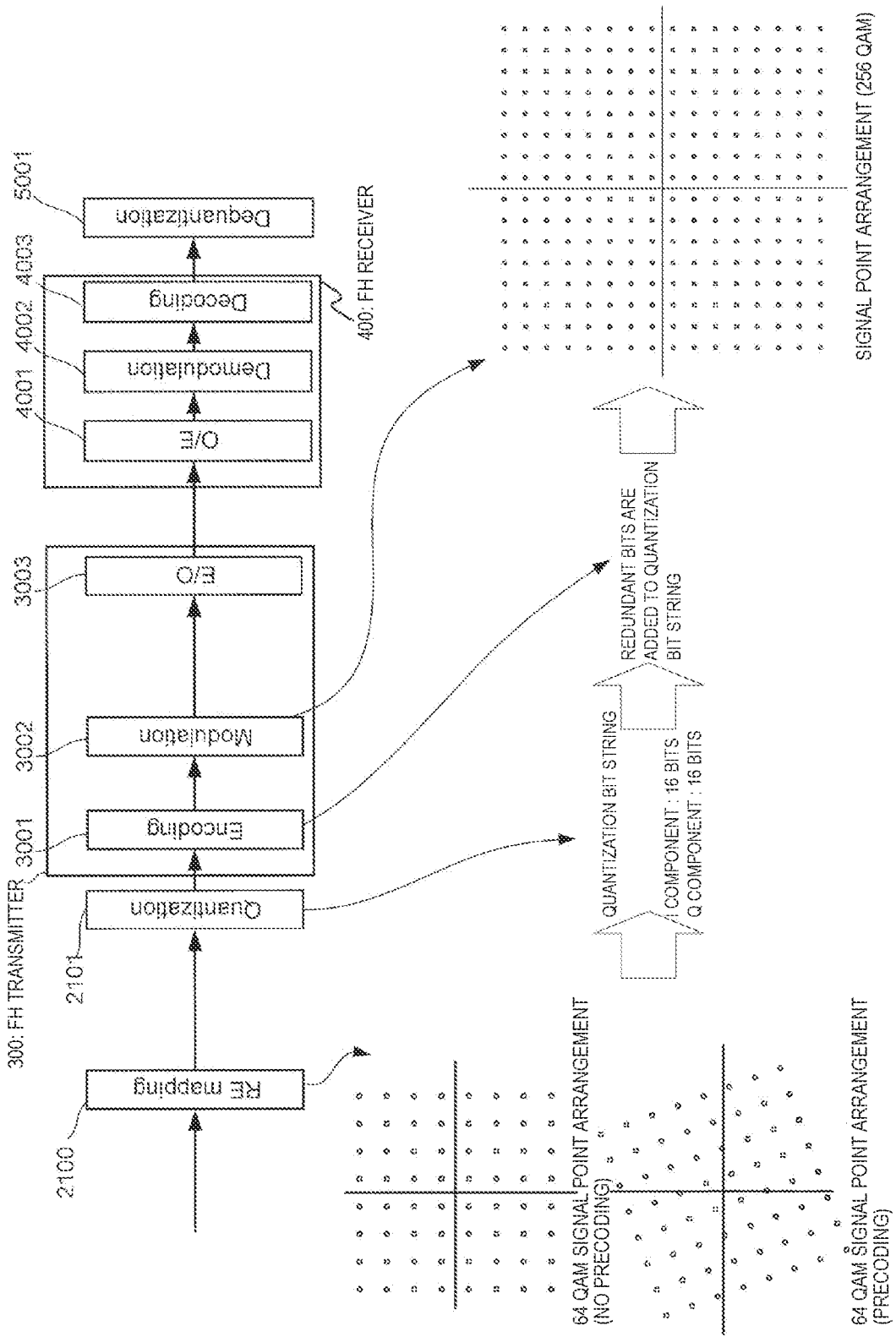
FIG. 1 is a diagram illustrating an example of processing of digital coherent transmission.

In optical transmission using PON or the like, digital coherent transmission is used (see O-RAN.WG4.CUS.0-v05.00). The use of the digital coherent transmission in the C-RAN configuration is also considered. FIG. 1 is a diagram illustrating an example of processing of the digital coherent transmission.

FIG. 1 illustrates an example of a configuration of FH transmitter 300 corresponding to a configuration on a transmitter side of the digital coherent transmission in the FH and FH receiver 400 corresponding to a configuration on a receiver side.

As illustrated in FIG. 1, a 64 quadrature amplitude modulation (QAM) symbol output from resource element (RE) mapping unit 2100 of the master station device is quantized by quantizer 2101. For example, an in-phase (I) component and a quadrature-phase (Q) component of the 64 QAM modulation symbol are each quantized with 16 bits. The I component and the Q component of the modulation symbol may be referred to as an I sample and a Q sample, respectively.

A quantization bit string output from the quantizer is subjected to encoding such as error correction by encoder 3001. When the encoding is performed by encoder 3001, the bit string to which redundancy is added is mapped to a 256 QAM modulation symbol by modulator 3002.

Electric-optic (E/O) converter 3003 performs optical transmission processing (for example, upsampling, waveform shaping, pre-equalization, and conversion into an optical signal) on the mapped symbol, and transmits a signal that has been subjected to the optical transmission processing. FH receiver 400 for the optical transmission performs processing corresponding to the processing of FH transmitter 300 and outputs a reception bit string. For example, optic-electro (O/E) converter 4001 performs optical reception processing, demodulator 4002 performs demodulation corresponding to modulator 3002, and decoder 4003 performs decoding corresponding to encoder 3001. The reception bit string is dequantized by dequantizer 5001, and a 64 QAM modulation symbol mapped by RE mapping unit 2100 can be obtained.

In the C-RAN configuration, as the number of slave station devices increases, the communication amount (for example, a data traffic volume) of the FH also increases, and thus the communication band of the FH becomes tight.

As an example of countermeasures against FH band tightness, WO 2013/76901 discloses a method for reducing data traffic of FH by changing function division of the master station device and the slave station device. WO 2013/76901 describes a configuration in which a slave station device includes a buffer, Packet Data Convergence Protocol (PDCP), radio link control (RLC), media access control (MAC), encoding, modulation, resource mapping, inverse fast Fourier transform (IFFT), up-conversion, and amplification, and a master station device includes a bearer termination. In general, the header and/or the redundancy increases as the processing proceeds closer to transmission, and thus the data amount increases. By disposing more functions in the slave station device than in the master station device, data traffic from the master station device to the slave station device can be reduced.

As described in Unexamined Japanese Patent Publication No. 2018-170805, when many functions are provided in the slave station device, the band of the FH can be reduced by reducing the data traffic of the FH. However, in order to perform cooperative control on a plurality of different slave station devices in the C-RAN configuration, it is desirable that the master station device has functions of MAC and high-physical (High-PHY). In addition, in a case where the MAC and High-PHY functions are provided on the side of the slave station device to perform cooperative control between the slave station devices, signaling of a control signal between the slave station devices is likely to increase.

Therefore, an example of the present disclosure provides a fronthaul transmission method for reducing the tightness of the band of the FH using, for example, an interface as defined in O-RAN.WG4.CUS.0-v05.00.

First Exemplary Embodiment

Figure 2:
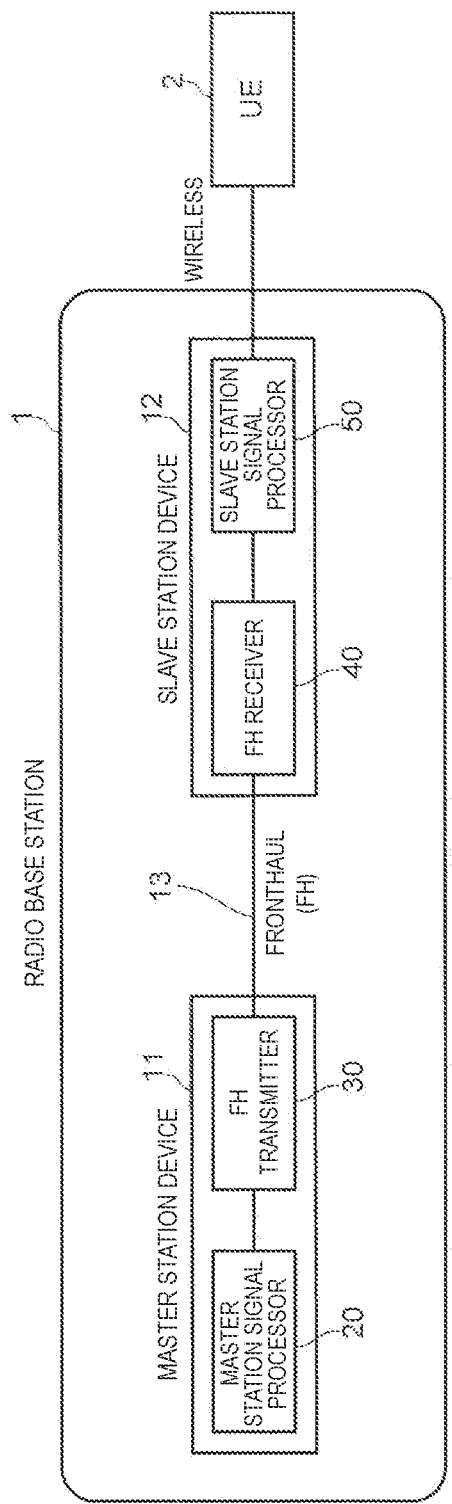
FIG. 2 is a diagram illustrating a first example of a configuration of a wireless communication system according to a first exemplary embodiment.

FIG. 2 is a diagram illustrating a first example of a configuration of a wireless communication system according to a first exemplary embodiment. As illustrated in FIG. 2, the wireless communication system includes, for example, radio base station 1 and user equipment (UE) 2, which is an example of a terminal device. A number of each of radio base stations 1 and UEs 2 may be two or more.

UE 2 is wirelessly connected to radio base station 1 to perform communication. The wireless communication between UE 2 and radio base station 1 includes at least one of uplink (UL) communication and downlink (DL) communication. In the following, an example of the configuration and operation focusing on DL of radio base station 1 will be described. An example focusing on the UL will be described later with reference to FIGS. 5, 6A, and 6B.

Radio base station 1 includes, for example, master station device 11 and slave station device 12 that are interconnected by FH 13. Master station device 11 may be referred to as, for example, BBU, centralized baseband unit (CBBU), REC, a central site, or central unit (CU). Slave station device 12 may be referred to as, for example, RRH, RE, a distributed site, or a distributed unit (DU). One master station device 11 may be connected to two or more slave station devices 12. One slave station device 12 may be connected to two or more UEs 2.

The following will describe an example in which the master station device includes a master station signal processor and an FH transmitter, but the present disclosure is not limited thereto. The master station device may have, for example, a configuration including the master station signal processor but not including the FH transmitter. For example, the FH transmitter may be referred to as a master station transmitter. Further, the following will describe an example in which the slave station device includes a slave station signal processor and an FH receiver, but the present disclosure is not limited thereto. The slave station device may have, for example, a configuration including the slave station signal processor but not including the FH receiver. For example, the FH receiver may be referred to as a slave station receiver.

By way of example, a wired transmission device (or a wired interface), such as a UTP cable, an STP cable, or an optical fiber cable, may be applied to FH 13. Wired interfaces may be interfaces that comply with standards or technologies such as common public radio interface (CPRI), evolved CPRI (eCPRI), open base station architecture initiative (OBSAI), radio over Ethernet (RoE), and radio over fiber (RoF). "Ethernet" is a registered trademark.

<Master Station Device 11>

Figure 3A:
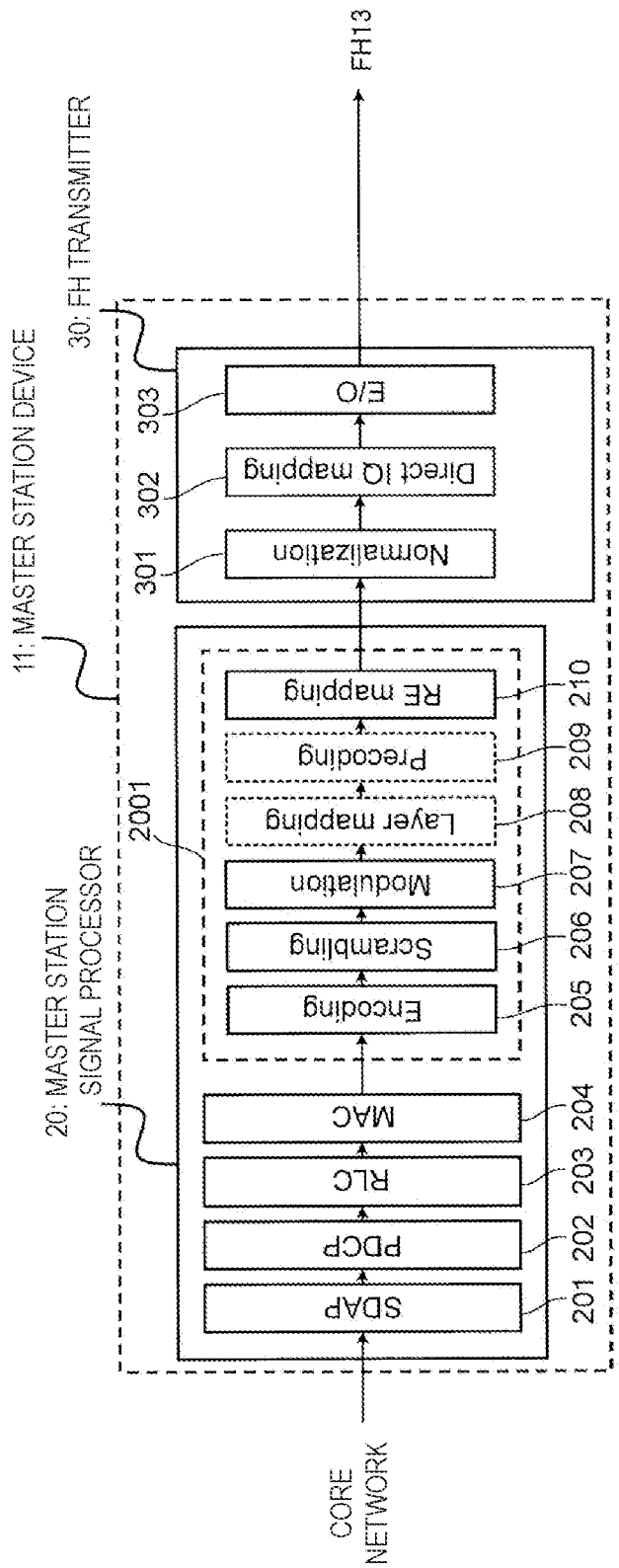
FIG. 3A is a diagram illustrating an example of a configuration of a master station signal processor and a frequency hopping (FH) transmitter illustrated in FIG. 2.
Figure 3B:
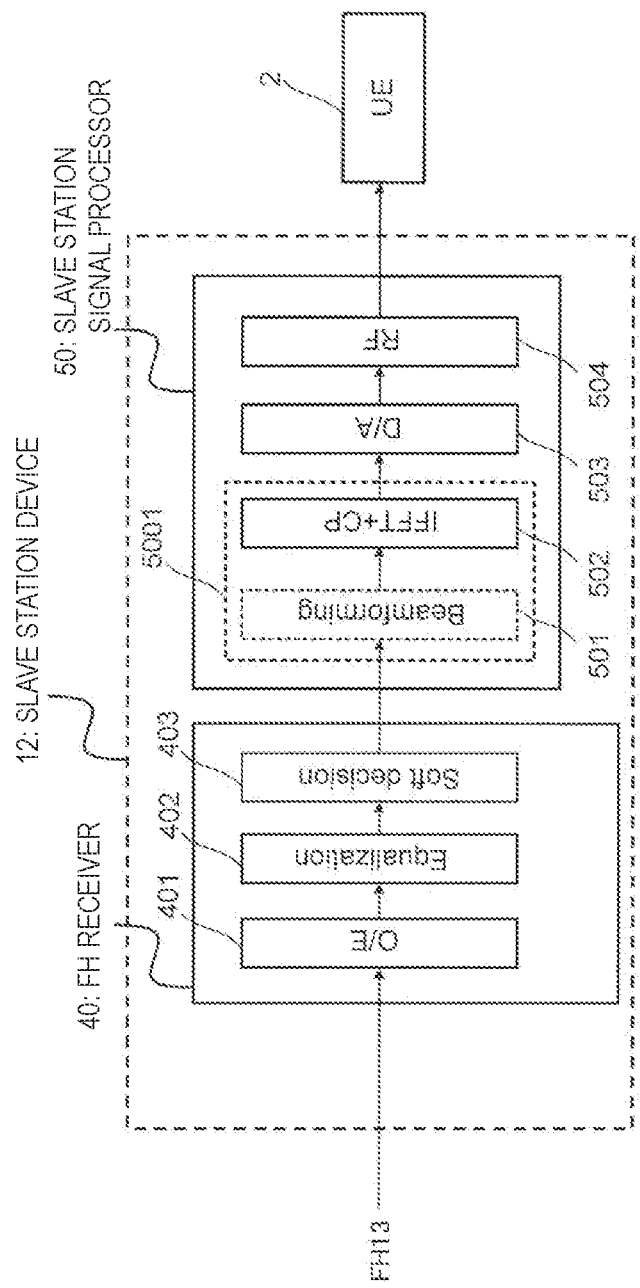
FIG. 3B is a diagram illustrating an example of a configuration of an FH receiver and a slave station signal processor illustrated in FIG. 2.

As illustrated in FIG. 2, for example, master station device 11 includes master station signal processor 20 and FH transmitter 30, and slave station device 12 includes FH receiver 40 and slave station signal processor 50. FIG. 3A illustrates an example of a configuration (DL) of master station signal processor 20 and FH transmitter 30. FIG. 3B illustrates an example of a configuration (DL) of FH receiver 40 and slave station signal processor 50.

(Master Station Signal Processor 20)

As illustrated in FIG. 3A, master station signal processor 20 includes, for example, service data adaptation protocol (SDAP) unit 201, packet data convergence protocol (PDCP) unit 202, radio link control (RLC) unit 203, and MAC unit 204. Further, master station signal processor 20 includes, for example, encoder 205, scrambling unit 206, modulator 207, layer mapping unit 208, precoder 209, and resource element (RE) mapping unit 210.

These functional units 201 to 210, together with functional units 501 and 502 in slave station signal processor 50, described later with reference to FIG. 3B, are a non-limiting example of a plurality of base station functional units provided in radio base station 1. Encoder 205, scrambling unit 206, modulator 207, layer mapping unit 208, precoder 209, and RE mapping unit 210, for example, form higher physical layer (High-PHY) block 2001.

For example, a signal (for example, user data) sent from a higher-level core network (for example, EPC or 5GC) is input to SDAP unit 201. "EPC" is an abbreviation for "evolved packet core", and 5GC is an abbreviation for "5th generation (5G) core network". 5G stands for a 5th generation radio access technology (RAT) and is sometimes referred to as new radio (NR). In addition, 5GC is sometimes referred to as next generation core network (NGC).

For example, SDAP unit 201 maps a QoS flow and a wireless bearer, adds an SDAP header to a signal (for example, packet) sent from the higher-level core network, and outputs the signal to PDCP unit 202.

PDCP unit 202 performs processing, such as encryption of user data and header compression, on the output from SDAP unit 201, and outputs a PDCP protocol data unit (PDU) to RLC unit 203.

RLC unit 203 performs processing, such as error detection and retransmission control in response to automatic repeat request (ARQ), on the output from PDCP unit 202, and outputs an RLC PDU.

MAC unit 204, for example, controls retransmission in response to a hybrid automatic repeat request (HARD), determines UE 2 subjected to allocation of communication opportunities by scheduling, determines a modulation and coding scheme (MCS) in wireless transmission, generates a MAC PDU from the RLC PDU, and outputs a transport block. A channel quality indicator (CQI) fed back from UE 2 may be used to decide the MCS.

MAC unit 204 outputs control information such as information on the decided MCS and resources used for the wireless transmission (for example, resource element (RE) information) to High-PHY block 2001 after MAC unit 204.

In High-PHY block 2001, encoder 205 adds a cyclic redundancy check (CRC) code to the transport block input from MAC unit 204, for example, and splits the transport block into code blocks. Further, encoder 205 performs, for example, encoding of the code block and rate matching corresponding to the MCS.

Scrambling unit 206 performs scrambling processing on the output from encoder 205, for example.

Modulator 207 modulates an output from scrambling unit 206 with a modulation scheme such as quadrature phase shift keying (QPSK), quadrature amplitude modulation (16QAM), 64QAM, or 256QAM.

Layer mapping unit 208 maps an output from modulator 207 to a plurality of layers, for example.

Precoder 209 precodes an output from layer mapping unit 208, for example.

RE mapping unit 210 maps, for example, an output from precoder 209 to a predetermined wireless resource (for example, RE). One RE is, for example, a wireless resource area with one sub-carrier and one symbol. A resource block (RB) may be configured by one or a plurality of REs. The one or plurality of RBs can be referred to as other terms such as physical RB (PRB), sub-carrier group (SCG), resource element group (REG: RE group), PRB pair, and RB pair.

Layer mapping unit 208 and precoder 209, which are used for multiple-input and multiple-output (MIMO) transmission, may be omitted when the MIMO transmission is not applied.

(FH Transmitter 30)

Meanwhile, as illustrated in FIG. 3A, FH transmitter 30 includes, for example, normalizer 301, direct IQ mapping unit 302, and electro-optic (E/O) converter 303.

Normalizer 301 normalizes the output signal (for example, the subcarrier signal) output from RE mapping unit 210. For example, normalizer 301 sets a normalization level so that the normalization level falls within a range of an amplitude level of the symbol arrangement used for mapping in direct IQ mapping unit 302, described later, and normalizes the output signal based on the normalization level. In a case where the amplitude level of the output signal from RE mapping unit 210 and the amplitude level of the symbol mapping in direct IQ mapping unit 302 are made to be uniform, normalizer 301 may not be provided to FH transmitter 30.

Direct IQ mapping unit 302 sets the normalized subcarrier signal output from normalizer 301 as a symbol for optical transmission. In other words, direct IQ mapping unit 302 directly processes the normalized subcarrier signal as a symbol for optical transmission. An example of processing of direct IQ mapping unit 302 will be described later.

Electro-optic converter 303 performs, for example, electro-optic conversion on a signal (symbol) output from direct IQ mapping unit 302, and transmits an optical signal obtained by the conversion to FH 13.

Normalizer 301, direct IQ mapping unit 302, and electro-optic converter 303 configure a non-limiting example of a transmitter that transmits a signal to FH 13.

FH transmitter 30 may control the signal transmission in the FH based on control information notified from master station signal processor 20. Further, FH receiver 40, described later, may control signal reception in the FH based on control information notified from master station signal processor 20 via FH transmitter 30. The control information notified from master station signal processor 20 includes, for example, information about an FH transmission method.

A method for notifying the control information is not limited. For example, the control information may be notified using a header area defined in the O-RAN (see O-RAN.WG4. CUS.0-v05.00). For example, a region where the FH transmission method is notified may be added to a region called common header fields of the header region. The added area may include information (for example, the size of one bit) instructing the presence or absence of FH error correction, and information (for example, multiple bits) instructing a transmission mode to be used among specified transmission modes.

As an example of the method of notifying the control information, the FH transmission method may be extended to the existing area of the common header fields and the control information may be notified. For example, the FH transmission method may be instructed by using information that defines a payload transmission method called payload Version.

As an example of the method for notifying the control information, an area for notifying the FH transmission method may be added to an area called section header fields. Alternatively, the header area may be extended and a new area may be added, or an area for notifying the FH transmission method may be added to a reserve area. The added area may include information (for example, the size of one bit) instructing the presence or absence of FH error correction, and information (for example, multiple bits) instructing a transmission mode to be used among specified transmission modes.

As an example of the method for notifying the control information, an area for notifying the FH transmission method may be added to PRB fields. For example, a new area may be added to the PRB fields, or an existing udCompParam may be extended and the FH transmission method may be notified.

<Slave Station Device 12>

An example of a configuration (DL) of slave station device 12 will be described below with reference to FIG. 3B.

(FH Receiver 40)

As illustrated in FIG. 3B, in slave station device 12, FH receiver 40 includes, for example, optic-electro (O/E) converter 401, equalizer 402, and soft decision unit 403.

Optic-electro converter 401 receives, for example, an optical signal transmitted through FH 13 and converts the optical signal into an electrical signal.

Equalizer 402 performs equalization processing corresponding to characteristics of a transmission path of FH 13 on the electrical signal output from optic-electro converter 401.

Soft decision unit 403 performs soft decision processing on the equalized signal output from equalizer 402. For example, soft decision unit 403 decides an amplitude level of an I component and an amplitude level of a Q component of the equalized signal.

Optic-electro converter 401, equalizer 402, and soft decision unit 403 configure non-limiting example of a reception unit that receives a signal from FH 13.

(Slave Station Signal Processor 50)

As illustrated in FIG. 3B, slave station signal processor 50 includes, for example, beamforming unit 501, inverse fast Fourier transform (IFFT)+cyclic prefix (CP) unit 502, and digital-to-analog (D/A) converter 503, and radio frequency (RF) unit 504.

Beamforming unit 501 and IFFT+CP unit 502 configure, for example, lower physical layer (Low-PHY) block 5001.

Beamforming unit 501 performs beam forming processing on the output from FH receiver 40, for example. Beamforming unit 501 may be omitted when beamforming is not performed in slave station device 12. Alternatively, the beamforming forming processing may be performed in master station device 11.

IFFT+CP unit 502 inserts IFFT and CP into an output from beamforming unit 501, for example.

D/A converter 503 converts, for example, an output from IFFT+CP unit 502 from a digital signal to an analog signal.

For example, RF unit 504 performs transmission RF processing, such as up-conversion processing to a radio frequency and amplification processing, on the output from D/A converter 503. A radio signal generated by the transmission RF processing is radiated into a space (for example, transmitted to UE 2) via an antenna (not illustrated) provided in RF unit 504, for example.

<Example of Direct IQ Mapping and Soft Decision Processing>

Figure 4:
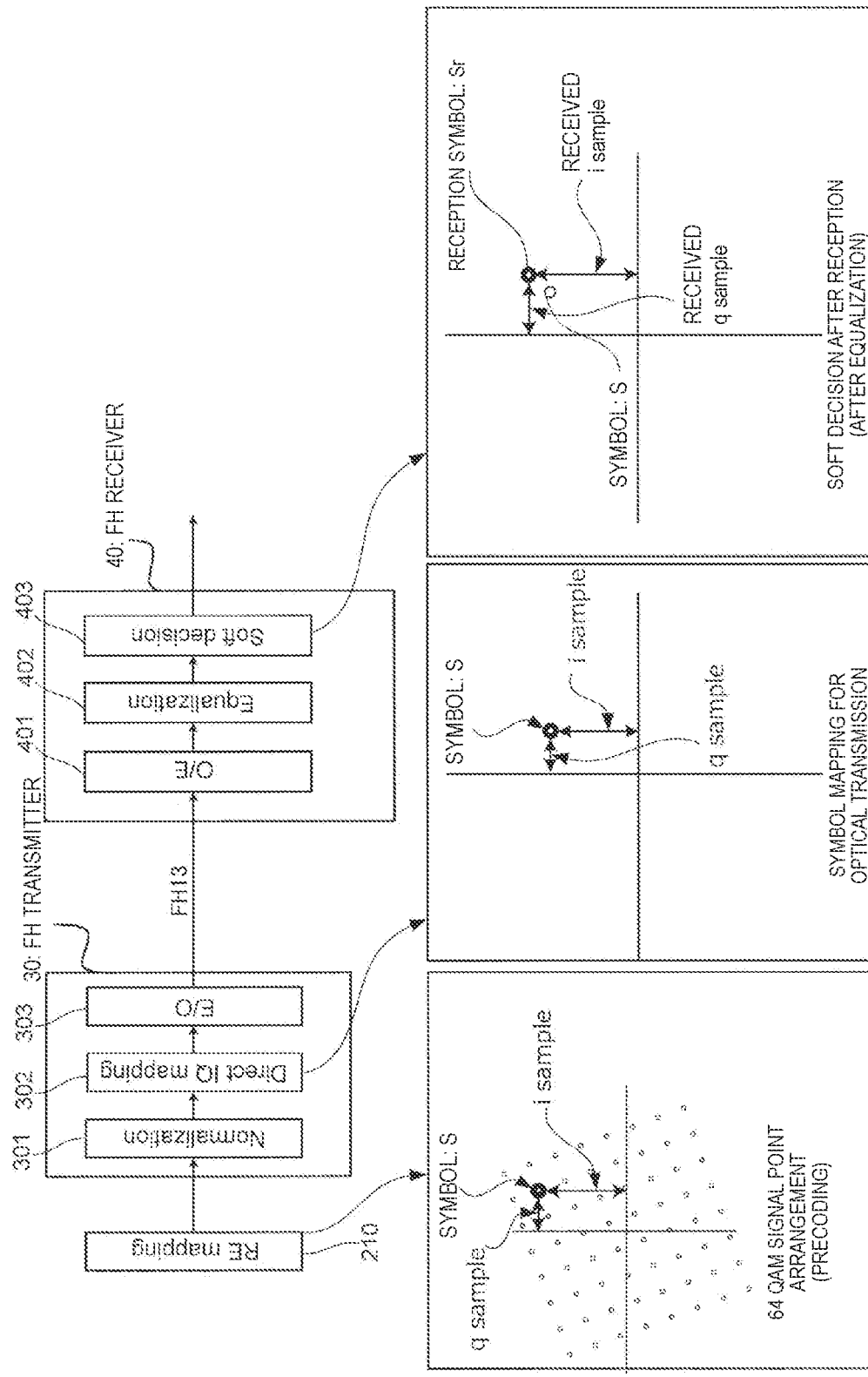
FIG. 4 is a diagram illustrating an example of direct image quality (IQ) mapping and soft decision processing.

FIG. 4 is a diagram illustrating an example of direct IQ mapping and soft decision processing. FIG. 4 illustrates a configuration example focusing on RE mapping unit 210 illustrated in FIG. 3A, FH transmitter 30 illustrated in FIG. 3A, and FH receiver 40 illustrated in FIG. 3B, together with an expression example in a complex plane (IQ plane) of a signal.

FIG. 4 illustrates a symbol S (an example of a subcarrier signal) mapped to a radio resource in RE mapping unit 210. FIG. 4 exemplarily illustrates the symbol S that has been subject to multilevel modulation (for example, 64 QAM modulation) in modulator 207 and has been subject to precoding in precoder 209. Note that i sample indicates an I component (in-phase component) of the symbol S, and q sample indicates a Q component (orthogonal component) of the symbol S.

Direct IQ mapping unit 302 directly sets (or may be referred to as "map") the subcarrier signal output from RE mapping unit 210 and normalized by normalizer 301 as a symbol for optical transmission.

For example, as illustrated in FIG. 4, an I component and a Q component of the symbol S of the subcarrier signal (may be referred to as subcarrier symbol) output from RE mapping unit 210 are set as the I component and the Q component of the symbol in the optical transmission, respectively. The subcarrier signal may be referred to as a subcarrier modulation signal.

In other words, for example, the symbol S is mapped to a symbol having the I component and the Q component in an optical region. The mapped symbol S is subjected to electro-optic conversion and transmitted to FH receiver 40 via FH 13.

As described above, in the case of "direct IQ mapping" with which the I component and the Q component of the symbol S are directly mapped to the I component and the Q component of the symbol of the optical transmission, respectively, it may be understood that there exists no candidate point (for example, the 256 QAM candidate point in FIG. 1) for multi-level modulation in the optical transmission. In other words, the "direct IQ mapping" does not depend on the multi-value number in the optical transmission. The symbol S output from RE mapping unit 210 is transmitted in FH 13 similarly to analog RoF and/or the coherent transmission.

In the present exemplary embodiment, the term "direct IQ mapping" does not mean that other processing is not interposed in the processing for mapping the symbol of an electrical area as the symbol of an optical area. For example, processing such as the normalization described above may be interposed in the mapping process.

In addition, the symbol S may not be subjected to encoding (for example, error correction encoding) before being transmitted to FH 13. An error that might occur in the FH transmission may be corrected by error correction processing for a radio segment (for example, a segment between radio base station 1 and UE2).

For example, the error correction capability required for the optical signal in FH 13 that is the optical transmission segment can be relaxed in accordance with the error correction capability in the radio segment. Therefore, even if the transmission error rate in FH 13 might be increased by applying the "direct IQ mapping", the communication quality between radio base station 1 and UE 2 is easily guaranteed by the error correction processing in the radio segment. Therefore, error correction can be omitted in the optical transmission using "direct IQ mapping".

The optically transmitted symbol S is received by FH receiver 40 via FH 13. The optical transmission symbol S may be affected by a transmission path (for example, affected by a noise) in FH 13, for example. In FH receiver 40, the received symbol is subjected to optic-electro conversion and equalization processing in optic-electro converter 401 and equalizer 402, respectively, for example, and then subjected to soft decision in soft decision unit 403.

For example, as illustrated in FIG. 4, soft decision unit 403 decides that a reception symbol Sr is the subcarrier signal transmitted from FH transmitter 30. Soft decision unit 403 decides, for example, an I component and a Q component of the reception symbol Sr.

In this case, the I component and the Q component of the reception symbol Sr are directly decided as the I component and the Q component of the subcarrier signal. Therefore, hard decision does not need to be performed on the reception symbol Sr based on signal point arrangement of the multi-level modulation. This eliminates an influence of erroneous signal decision.

In the example of FIG. 4, precoding is performed, but precoding may not be performed. As in the case where the precoding illustrated in FIG. 4 is performed, when the precoding is not performed, the I component and the Q component of the symbol S of the subcarrier signal output from RE mapping unit 210 are set as the I component and the Q component of the symbol in the optical transmission, respectively.

As described above, master station device 11 in the DL configuration according to the first exemplary embodiment includes master station signal processor 20 (an example of processor) that outputs a subcarrier modulation signal, and FH transmitter 30 (an example of a transmitter) that maps an I component and a Q component of the subcarrier modulation signal to an optical signal to be transmitted to the FH. Further, slave station device 12 in the DL configuration according to the first exemplary embodiment includes FH receiver 40 (an example of a receiver) that receives the optical signal via the FH, and slave station signal processor 50 (an example of a processor) that identifies the subcarrier modulation signal based on the I component and the Q component of the subcarrier modulation signal mapped to the optical signal. With this configuration, as illustrated in FIG. 4, since the subcarrier signal output from RE mapping unit 210 is mapped to the optical signal, for example, quantization and encoding of the signal can be omitted. Therefore, for example, an increase in redundant bits due to application of quantization and encoding can be controlled, and transmission efficiency can be improved.

Further, in the example of FIG. 4, since FH receiver 40 performs soft decision, a possible error in symbol decision can be reduced as compared with the case using hard decision of a symbol, for example.

FIGS. 3A and 3B illustrate the example of the DL configuration, but a configuration similar to the DL configuration may be applied to the UL. An example of the UL configuration will be described below.

Figure 5:
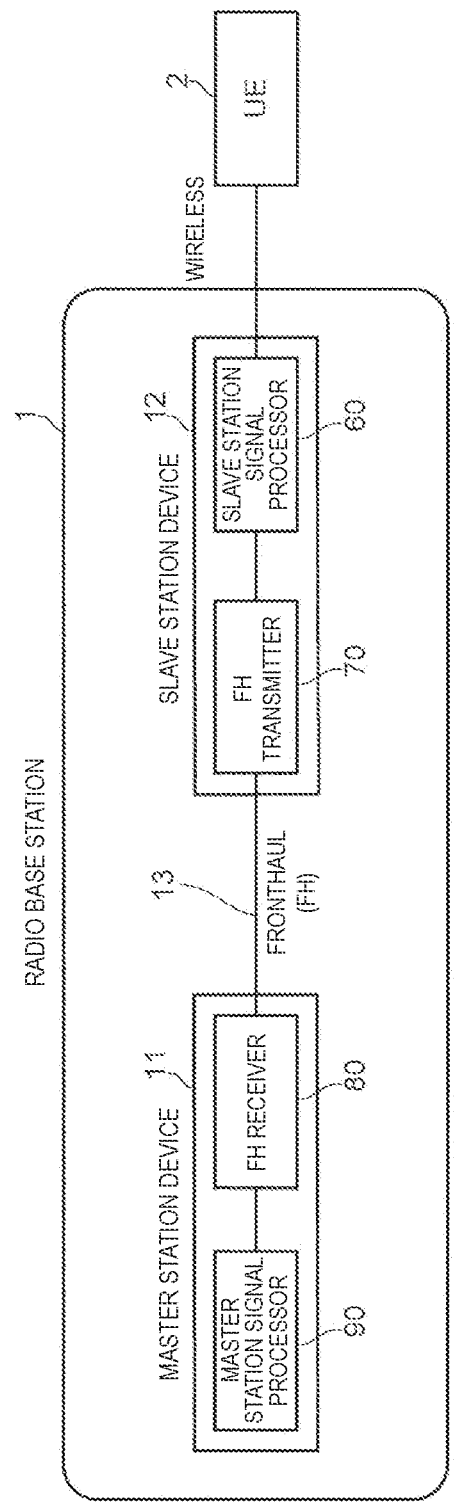
FIG. 5 is a diagram illustrating a second example of a configuration of the wireless communication system according to the first exemplary embodiment.

FIG. 5 is a diagram illustrating a second example of a configuration of the wireless communication system according to the first exemplary embodiment. As illustrated in FIG. 5, in relation to UL communication from UE 2 to radio base station 1, radio base station 1 includes, for example, slave station signal processor 60 and FH transmitter 70 in slave station device 12, and includes, for example, FH receiver 80 and master station signal processor 90 in master station device 11.

Figure 6A:
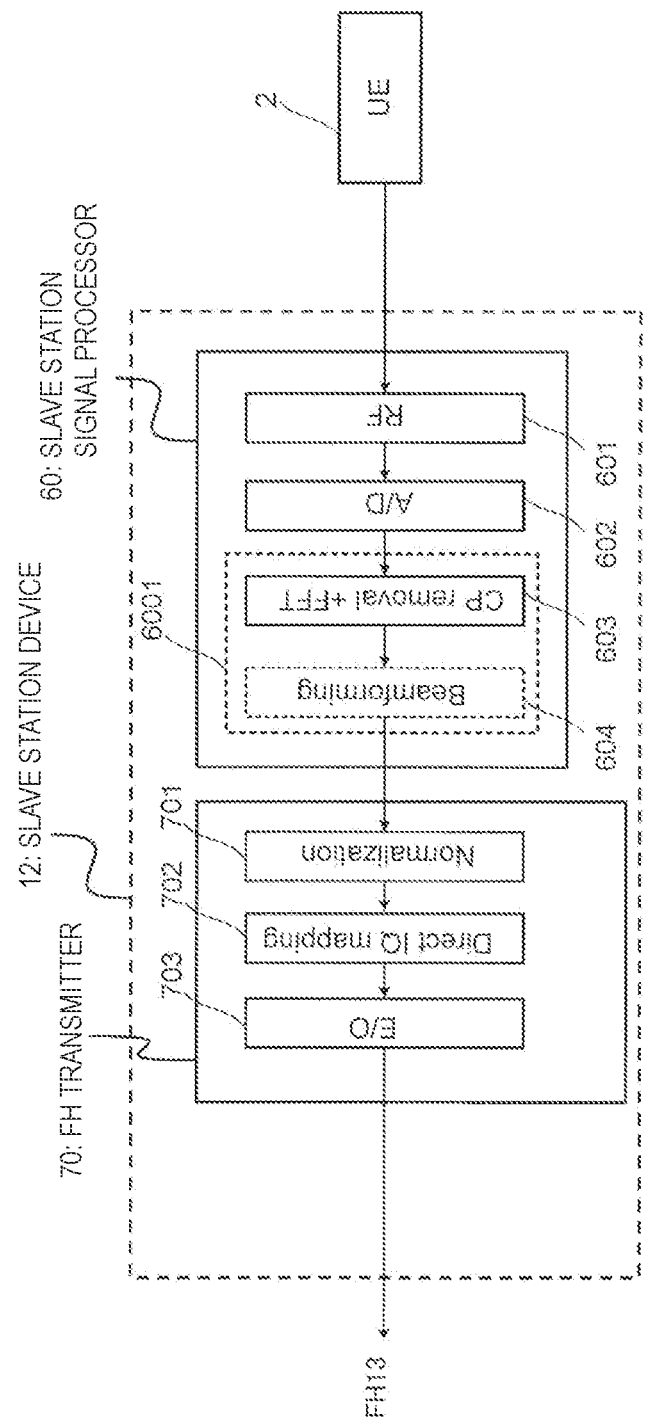
FIG. 6A is a diagram illustrating an example of a configuration of the slave station signal processor and the FH transmitter illustrated in FIG. 5.

FIG. 6A illustrate an example of the configuration of slave station device 12 focusing on the UL (slave station signal processor 60 and FH transmitter 70). FIG. 6B illustrates an example of the configuration of master station device 11 focusing on the UL (FH receiver 80 and master station signal processor 90).

<Slave Station Device 12>

First, an example of the configuration of slave station signal processor 60 and FH transmitter 70 in slave station device 12 will be described with reference to FIG. 6A. As in FIG. 2, two or more slave station devices 12 can be connected to one master station device 11, and one slave station device 12 can be connected to two or more UEs 2.

(Slave Station Signal Processor 60)

As illustrated in FIG. 6A, slave station signal processor 60 includes, for example, RF unit 601, analog to digital (A/D) converter 602, CP removal+first Fourier transform (FFT) unit 603, and beamforming unit 604.

For example, RF unit 601 has an antenna, receives a radio signal of the UL transmitted from UE 2 through the antenna, and performs reception RF processing, such as down-conversion processing and low noise amplification processing, on the received radio signal.

A/D converter 602 converts, for example, an output (analog signal) from RF unit 601 into a digital signal.

CP removal+FFT unit 603 and beamforming unit 604 configure, for example, lower physical layer (Low-PHY) block 6001.

CP removal+FFT unit 603 performs FFT and CP removal on an output from A/D converter 602, for example.

Beamforming unit 604 performs reception beam forming processing on an output from CP removal+FFT unit 603, for example. Beamforming unit 604 may be omitted when beamforming is not performed in slave station device 12.

(FH Transmitter 70)

Meanwhile, as illustrated in FIG. 6A, FH transmitter 70 includes, for example, normalizer 701, direct IQ mapping unit 702, and electro-optic (E/O) converter 703.

Functional units 701 to 703 of FH transmitter 70 for the UL may be regarded as equivalent to functional units 301 to 303 (see FIG. 3A) of FH transmitter 30 for the DL, respectively.

For example, an output signal from slave station signal processor 60 is input to normalizer 701. For example, normalizer 701 sets a normalization level so that the normalization level falls within a range of an amplitude level of the symbol arrangement used for mapping in direct IQ mapping unit 702, described later, and normalizes the output signal based on the normalization level. In a case where the amplitude level of the output signal from slave station signal processor 60 and the amplitude level of the symbol mapping in direct IQ mapping unit 702 are made to be uniform, normalizer 701 may not be included in FH transmitter 70.

Direct IQ mapping unit 702 sets the normalized subcarrier signal output from normalizer 701 as a symbol for optical transmission like direct IQ mapping unit 302. In other words, direct IQ mapping unit 702 directly processes the normalized subcarrier signal as a symbol for the optical transmission.

Electro-optic converter 703 performs, for example, electro-optic conversion on a signal (symbol) output from direct IQ mapping unit 702, and transmits an optical signal obtained by the conversion to FH 13.

<Master Station Device 11>

Next, an example of the configuration of FH receiver 80 and master station signal processor 90 in master station device 11 will be described with reference to FIG. 6B.

(FH Receiver 80)

As illustrated in FIG. 6B, FH receiver 80 includes, for example, optic-electro converter 801, equalizer 802, and soft decision unit 803.

Functional units 801 to 803 of FH receiver 80 for the UL may be regarded as equivalent to functional units 401 to 403 (see FIG. 3B) of FH receiver 40 for the DL, respectively.

For example, optic-electro converter 801 receives an optical signal transmitted through FH 13 and converts the optical signal into an electrical signal.

Equalizer 802 performs equalization processing corresponding to characteristics of the transmission path of FH 13 on the electrical signal output from optic-electro converter 801.

Soft decision unit 803 performs soft decision processing on the equalized signal output from equalizer 802. For example, soft decision unit 803 decides an amplitude level of an I component and an amplitude level of a Q component of the equalized signal.

(Master Station Signal Processor 90)

Meanwhile, master station signal processor 90 includes RE demapping unit 901, layer demapping unit 902, demodulator 903, descrambling unit 904, and decoder 905, as illustrated in FIG. 6B, for example. These functional units 901 to 905 configure, for example, higher physical layer (High-PHY) block 9001.

Further, master station signal processor 90 includes, for example, MAC unit 906, RLC unit 907, PDCP unit 908, and SDAP unit 909.

RE demapping unit 901 demaps the UL signal mapped to a radio resource (for example, RE).

Layer demapping unit 902 demaps the UL signal mapped for each layer in an output from RE demapping unit 901, for example. Layer demapping unit 902, which is used for the MIMO transmission, may be omitted when the MIMO transmission is not applied.

Demodulator 903 demodulates an output from layer demapping unit 902 using a demodulation scheme corresponding to a modulation scheme such as QPSK, 16QAM, 64QAM, or 256QAM.

Descrambling unit 904 performs descrambling processing for descrambling an output from demodulator 903, for example.

Decoder 905 decodes, for example, an output from descrambling unit 904.

For example, MAC unit 906 generates an RLC PDU from the MAC PDU of the UL signal and outputs the RLC PDU to RLC unit 907.

RLC unit 907 performs processing such as error detection and retransmission control using the ARQ on the output from MAC unit 906, and outputs the PDCP PDU.

PDCP unit 908 performs processing, such as decoding of encoded user data and header decompression, on the output from RLC unit 907, and outputs the SDAP PDU to SDAP unit 909.

For example, SDAP unit 909 maps QoS flow and radio bearer, removes the SDAP header from the output from PDCP unit 908, and transmits the output to a higher-level core network.

FH receiver 80 may control the signal reception in the FH based on control information notified from master station signal processor 90. Further, FH transmitter 70 may control signal transmission in the FH based on control information notified from master station signal processor 90. An example of the control information notified from master station signal processor 90 may be similar to the control information notified from master station signal processor 20, described above, for the DL.

As described above, slave station device 12 in the UL configuration according to the first exemplary embodiment includes slave station signal processor 60 that outputs the subcarrier modulation signal, and FH transmitter 70 that maps the I component and the Q component of the subcarrier modulation signal to the optical signal to be transmitted to the FH. Further, master station device 11 in the UL configuration according to the first exemplary embodiment includes FH receiver 80 that receives an optical signal via the FH, and master station signal processor 90 that identifies the subcarrier modulation signal based on the I component and the Q component of the subcarrier modulation signal mapped to the optical signal. With such a configuration in the UL, a functional effect equivalent to or similar to the configuration of the DL illustrated in FIGS. 3A and 3B can be obtained.

Second Exemplary Embodiment

Figure 7A:
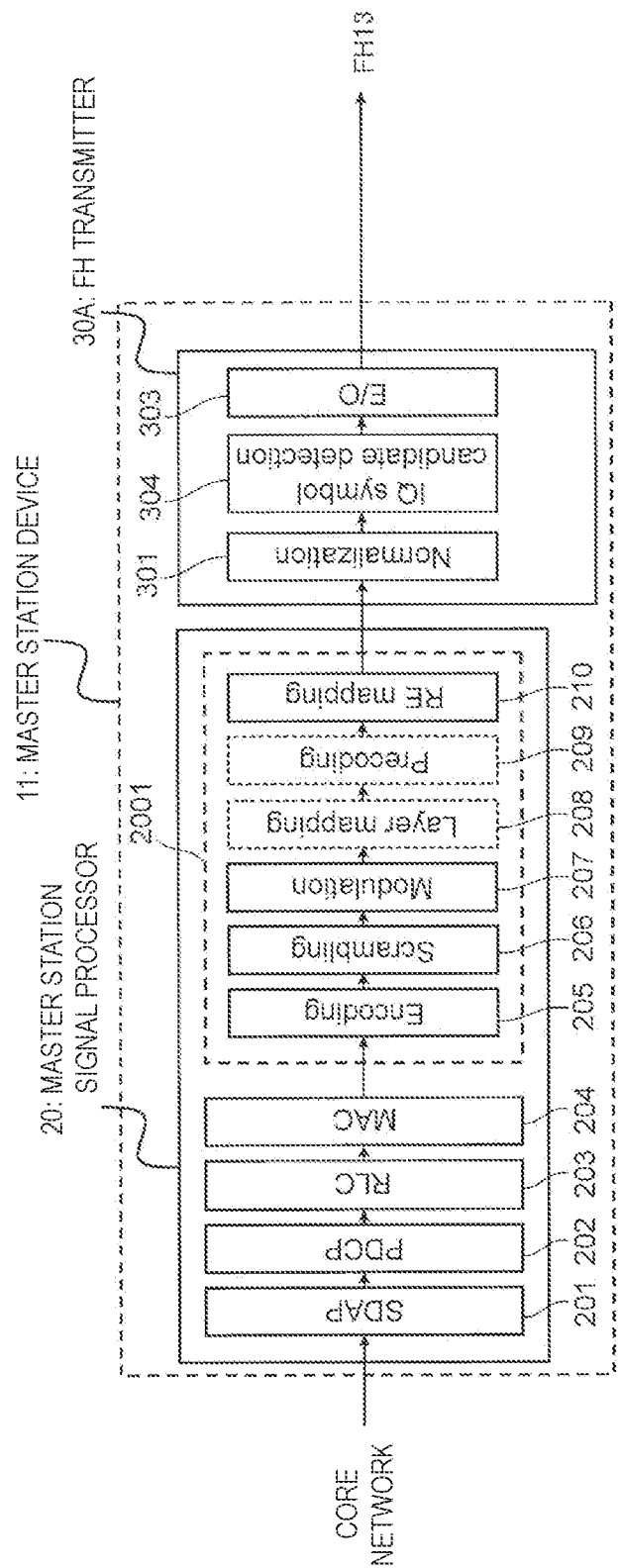
FIG. 7A is a diagram illustrating a first example of a configuration of a master station signal processor and an FH transmitter according to a second exemplary embodiment.
Figure 7B:
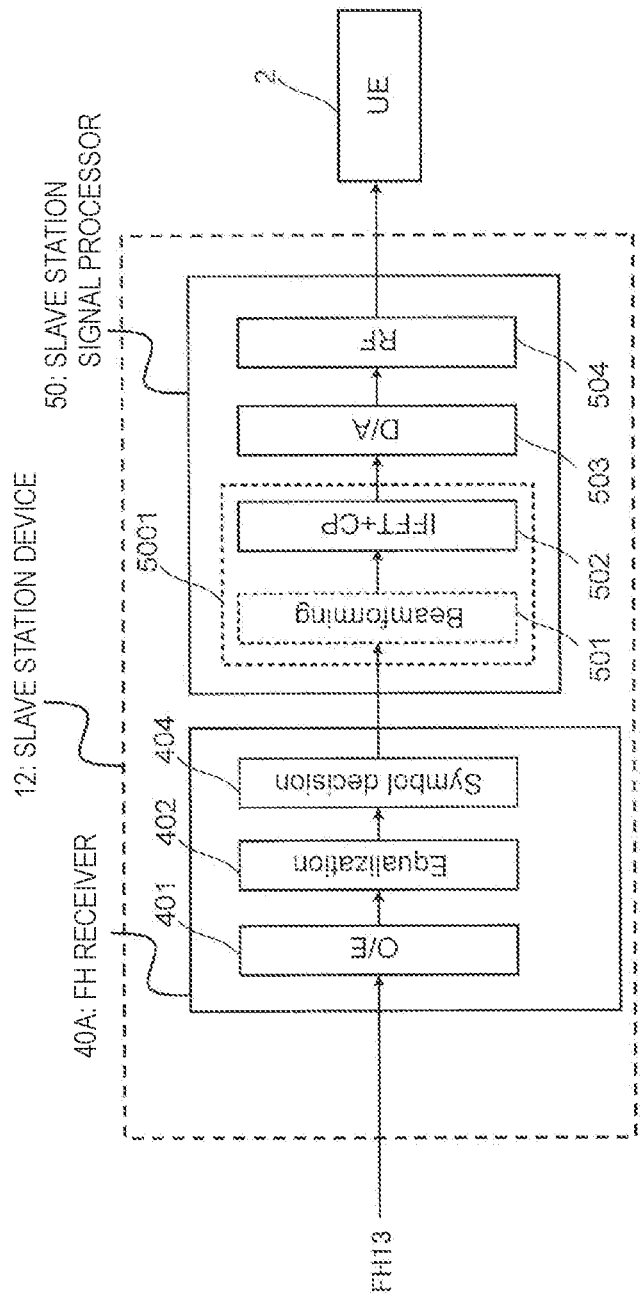
FIG. 7B is a diagram illustrating a first example of a configuration of an FH receiver and a slave station signal processor according to the second exemplary embodiment.

Next, a configuration example of DL according to a second exemplary embodiment will be described with reference to FIGS. 7A and 7B. In FIGS. 7A and 7B, the same components as those in FIGS. 3A and 3B are denoted by the same reference marks, and the description thereof will be omitted as appropriated. The second exemplary embodiment is different from the first exemplary embodiment in a configuration of an FH transmitter and an FH receiver. A system configuration example may be equal to that in FIG. 2. Further, two or more slave station devices 12 can be connected to one master station device 11 and one slave station device 12 can be connected to two or more UEs 2 as in the first exemplary embodiment.

In the second exemplary embodiment, as illustrated in FIG. 7A, FH transmitter 30A includes, for example, normalization unit 301, IQ symbol candidate detector 304, and electro-optic (E/O) converter 303.

IQ symbol candidate detector 304 detects a symbol candidate to be mapped in optical transmission, based on a normalized subcarrier signal output from normalizer 301, for example. For example, in a case where multi-level modulation (for example, 256 QAM modulation) is used in optical transmission, IQ symbol candidate detector 304 may determine, as a signal point (for example, a symbol) in optical transmission, a candidate signal point having a predetermined relationship with a signal point indicated by an I component and a Q component of the subcarrier signal among the number (for example, 256) of candidate signal points in accordance with the order of multi-level modulation in the signal point arrangement on an IQ plane. The predetermined relationship is such that the signal points are closest on the IQ plane. When this predetermined relationship is used, the signal point in the optical transmission may be a candidate signal point closest to the signal point indicated by the I component and the Q component of the subcarrier signal among the number of candidate signal points corresponding to the order of the multi-value modulation. An example of processing of IQ symbol candidate detector 304 will be described later.

In the second exemplary embodiment, FH receiver 40A may include, for example, optic-electro (O/E) converter 401, equalizer 402, and symbol decision unit 404 as illustrated in FIG. 7B.

Symbol decision unit 404 decides, for example, a symbol of the equalized signal output from equalizer 402. For example, in a case where 256 QAM modulation is used in optical transmission, symbol decision unit 404 decides a candidate signal point having a predetermined relationship with the signal indicated by the I component and the Q component after equalization processing among the 256 QAM candidate signal points. The predetermined relationship is, for example, similar to that in IQ symbol candidate detector 304.

<Example of IQ Symbol Candidate Detection and Symbol Decision>

FIG. 8 is a diagram illustrating an example of IQ symbol candidate detection and symbol decision. FIG. 8 illustrates a configuration example focusing on RE mapping unit 210 illustrated in FIG. 7A, FH transmitter 30A illustrated in FIG. 7A, and FH receiver 40A illustrated in FIG. 7B, together with an expression example in an image quality plane (IQ plane) of a signal.

FIG. 8 illustrates a symbol S (an example of a subcarrier signal) mapped to a radio resource in RE mapping unit 210. FIG. 4 exemplarily illustrates the symbol S that has been subjected to 64 QAM modulation in modulator 207 and has been subjected to precoding in precoder 209. Note that i sample indicates an I component of the symbol S, and q sample indicates a Q component of the symbol S.

IQ symbol candidate detector 204 detects a symbol candidate to be mapped in optical transmission among candidate signal points, based on a subcarrier signal output from RE mapping unit 210 and normalized in normalizer 301. In FIG. 8, as an example, multi-value modulation (for example, 256 QAM modulation) is used in optical transmission. As illustrated in FIG. 8, when the symbol S is output from RE mapping unit 210, a symbol T closest to symbol S among the 256 QAM candidate signal points is set as the symbol for the optical transmission. The symbol T is subjected to electro-optic conversion and transmitted to FH receiver 40A via FH 13.

In addition, the symbol T may not be subjected to encoding (for example, error correction encoding) for FH transmission before being transmitted to FH 13. An error that might occur in the FH transmission may be corrected by error correction processing for a radio segment (for example, a segment between radio base station 1 and UE2).

For example, the error correction capability required for the optical signal in FH 13 that is the optical transmission segment can be relaxed in accordance with the error correction capability in the radio segment. Therefore, even if the transmission error rate in FH 13 is increased by not performing encoding for the FT transmission, the quality of communication between radio base station 1 and UE 2 is easily guaranteed by the error correction processing in the radio segment.

The optically transmitted symbol T is received by FH receiver 40A via FH 13. The optically transmitted symbol T may be affected by a transmission path (for example, affected by a noise) in FH 13, for example. In FH receiver 40A, the received symbol is subjected to optic-electro conversion and equalization processing in optic-electro converter 401 and equalizer 402, respectively, for example, and then subjected to symbol decision in symbol decision unit 404.

For example, as illustrated in FIG. 8, a decision is made that a symbol Tx closest to a received symbol Tr among the 256 QAM candidate signal points is a symbol (for example, the subcarrier modulation signal) transmitted from FH transmitter 30A.

FIG. 8 illustrates an example in which precoding is performed, but precoding may not be performed. As in the case where the precoding illustrated in FIG. 8 is performed, also when the precoding is not performed, a symbol in the optical transmission is determined based on the I component and the Q component of the symbol S of the subcarrier signal output from RE mapping unit 210.

As described above, master station device 11 in the DL configuration according to the second exemplary embodiment includes master station signal processor 20 (an example of a processor) that outputs the subcarrier modulation signal, and FH transmitter 30A (an example of a transmitter) that maps the I component and the Q component of the subcarrier modulation signal to the optical signal to be transmitted to the FH. Further, slave station device 12 in the DL configuration according to the second exemplary embodiment includes FH receiver 40A (an example of a receiver) that receives an optical signal via the FH, and slave station signal processor 50 (an example of a processor) that identifies a subcarrier modulation signal based on the I component and the Q component of the subcarrier modulation signal mapped to the optical signal. With this configuration, as illustrated in FIG. 8, since the subcarrier signal output from RE mapping unit 210 is mapped to the optical signal, for example, quantization and encoding of the signal can be omitted. Therefore, for example, an increase in redundant bits due to application of quantization and encoding can be controlled, and transmission efficiency can be improved.

Further, in the second exemplary embodiment, as illustrated in FIG. 8, symbol decision is made based on signal point arrangement used for the optical transmission, and thus noise resistance can be improved.

In addition, in the second exemplary embodiment, since symbol mapping and symbol decision for optical transmission are performed based on signal point arrangement used for the optical transmission, a system can be configured by using an existing transmission device and reception device for the optical transmission.

Further, in the example of FIG. 8, since FH receiver 40A performs symbol hard decision, a symbol transmitted from FH transmitter 30A can be restored.

FIGS. 7A and 7B illustrate examples of the DL configuration, but a configuration similar to the DL configuration may be applied to the UL. An example of the UL configuration will be described below.

The system configuration example of the UL in the second exemplary embodiment may be identical to the configuration example illustrated in FIG. 5 according to the first exemplary embodiment. Further, two or more slave station devices 12 can be connected to one master station device 11, and one slave station device 12 can be connected to two or more UEs 2, similarly to the first exemplary embodiment.

Figure 9A:
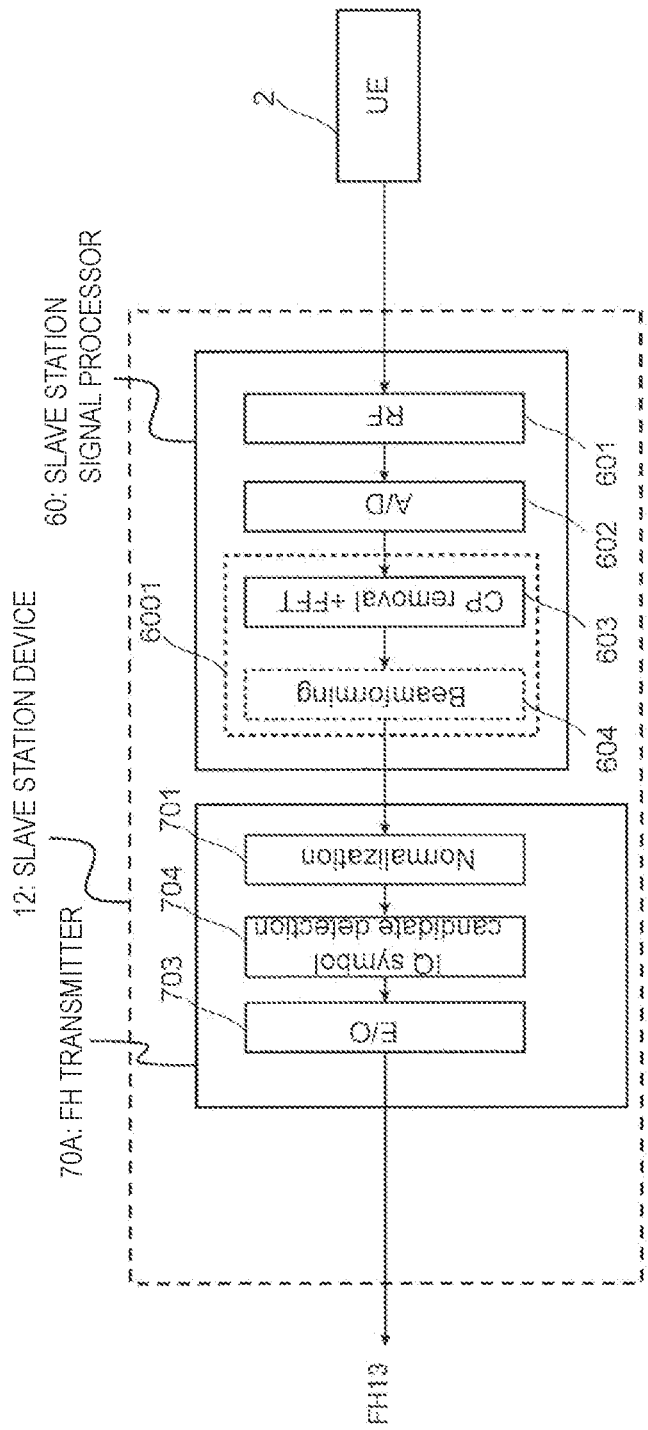
FIG. 9A is a diagram illustrating a second example of the configuration of the slave station signal processor and the FH transmitter according to the second exemplary embodiment.
Figure 9B:
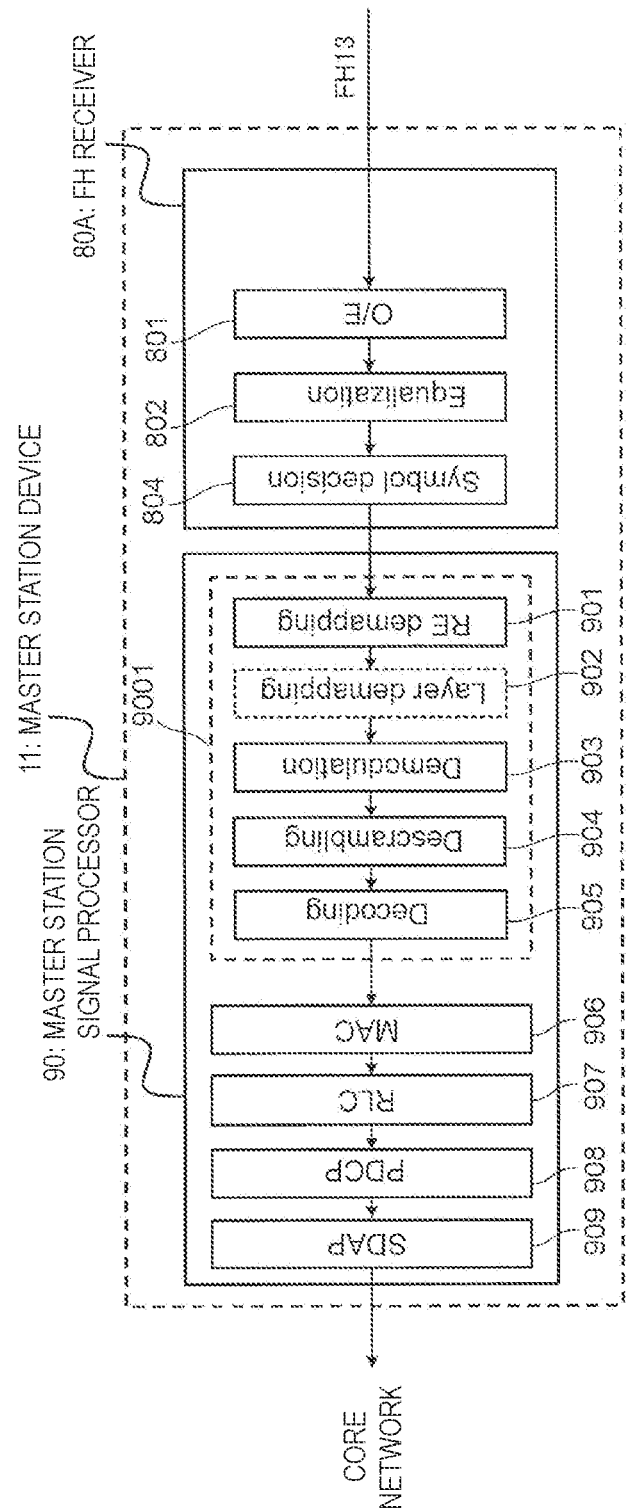
FIG. 9B is a diagram illustrating a second example of a configuration of the FH receiver and the master station signal processor according to the second exemplary embodiment.

FIG. 9A illustrates an example of the configuration of slave station device 12 focusing on the UL (slave station signal processor 60 and FH transmitter 70A). FIG. 9B illustrates an example of the configuration of master station device 11 focusing on the UL (FH receiver 80A and master station signal processor 90). In FIGS. 9A and 9B, the same components as those in FIGS. 6A and 6B are denoted by the same reference marks, and the description thereof will be omitted as appropriated.

In the second exemplary embodiment, as illustrated in FIG. 9A, FH transmitter 70A includes, for example, normalizer 701, IQ symbol candidate detector 704, and electro-optic (E/O) converter 703.

IQ symbol candidate detector 704 detects a symbol for the optical transmission among candidates, based on a normalized subcarrier signal output from normalizer 701. For example, in a case where 256 QAM modulation is used in the optical transmission, IQ symbol candidate detector 704 determines, as a transmission symbol, a candidate point closest to the subcarrier signal in the signal point arrangement on the IQ plane indicating 256 QAM candidate points.

In the second exemplary embodiment, FH receiver 80A includes, for example, optic-electro converter 801, equalizer 802, and symbol decision unit 804 as illustrated in FIG. 9B.

Symbol decision unit 804 decides a symbol of the equalized signal output from equalizer 802. For example, in a case where 256 QAM modulation is used in the optical transmission, symbol decision unit 804 decides that a candidate point closest to the subcarrier signal in the signal point arrangement in the IQ plane indicating the 256 QAM candidate signal points is the received symbol.

As described above, slave station device 12 in the UL configuration according to the second exemplary embodiment includes slave station signal processor 60 that outputs the subcarrier modulation signal, and FH transmitter 70A that maps the I component and the Q component of the subcarrier modulation signal to an optical signal to be transmitted to the FH. Further, master station device 11 in the UL configuration according to the second exemplary embodiment includes FH receiver 80A that receives an optical signal via the FH, and master station signal processor 90 that identifies the subcarrier modulation signal based on the I component and the Q component of the subcarrier modulation signal mapped to the optical signal. With the configuration in the UL, a functional effect equivalent to or similar to the configuration of the DL illustrated in FIGS. 7A and 7B can be obtained.

The configuration described in the first exemplary embodiment and the configuration described in the second exemplary embodiment may be used in combination.

For example, in the DL configuration, FH transmitter 30 described in the first exemplary embodiment and FH receiver 40A described in the second exemplary embodiment may be combined. In this case, the symbol mapped by direct IQ mapping unit 302 of FH transmitter 30 is received by FH receiver 40A, and the symbol closest to the received symbol is decided from the candidate points by symbol decision unit 404 of FH receiver 40A.

For example, in the DL configuration, FH transmitter 30A described in the second exemplary embodiment and FH receiver 40 described in the first exemplary embodiment may be combined. In this case, the symbol mapped by IQ symbol candidate detector 304 of FH transmitter 30A is received by FH receiver 40, and the received symbol is decided by soft decision unit 403 of FH receiver 40.

In the first and second exemplary embodiments, the configuration of the DL and the configuration of the UL are separated from each other. However, the configuration of the DL and the configuration of the UL may be provided as physically different devices, or may be achieved in physically the same device.

Further, in the first and second exemplary embodiments, in master station device 11, master station signal processor 20 of the DL and master station signal processor 90 of the UL may be configured as physically different devices or may be configured in physically the same device.

Likewise, in master station device 11, FH transmitter 30 (or 30A) of the DL and FH receiver 80 (or 80A) of the UL may be configured as physically different devices or may be configured in physically the same device. Further, FH transmitter 30 (or 30A) and FH receiver 80 (or 80A) may be integrated as, for example, an FH transmitter-receiver or an FH communication device shared by the DL and the UL.

Similarly, in slave station device 12, FH receiver 40 (or 40A) of the DL and FH transmitter 70 (or 70A) of the UL may be configured as physically different devices or may be configured in physically the same device. Further, FH receiver 40 (or 40A) and FH transmitter 70 (or 70A) may be integrated as, for example, an FH transmitter-receiver or an FH communication device shared by the DL and the UL.

Slave station signal processor 50 of the DL and slave station signal processor 60 of the UL may be configured as physically different devices, or may be configured in physically the same device.

Further, in master station device 11, at least one of master station signal processor 20 of the DL and master station signal processor 90 of the UL may include logical slices.

Similarly, in slave station device 12, at least one of slave station signal processor 50 of the DL and slave station signal processor 60 of the UL may include logical slices.

At least one of master station device 11 and slave station device 12 may include logical slices.

In the above-described first and second exemplary embodiments, the description has been made focusing on a one-to-one connection relationship between master station device 11 and slave station device 12. However, the connection relationship between master station device 11 and slave station device 12 may be a one-to-many relationship.

When the notation " . . . unit" used in the first and second exemplary embodiments described above means a physical element, this notation may be replaced with another notation such as "... circuitry", "... device", or "... module". On the other hand, when the notation "... unit" means a logical element, this notation may be replaced with "slice" as described above, for example.

For example, in the DL, master station signal processor 20 (see FIG. 3A) in the first exemplary embodiment and master station signal processor 20 (see FIG. 7A) in the second exemplary embodiment may be provided in one master station device 11. Further, in the DL, slave station signal processor 50 (see FIG. 3B) in the first exemplary embodiment and slave station signal processor 50 (see FIG. 7B) in the first exemplary embodiment may be provided in one master station device 11.

In the UL, slave station signal processor 60 (see FIG. 6A) in the first exemplary embodiment and slave station signal processor 60 (see FIG. 9A) in the second exemplary embodiment may be provided in one slave station device 12. Further, in the UL, master station signal processor 90 (see FIG. 6B) in the first exemplary embodiment and master station signal processor 90 (FIG. 9B) in the second exemplary embodiment may be provided in one master station device 11.

In the first and second exemplary embodiments, a case with one functional split point (in other words, two functional split configurations including master station device 11 and slave station device 12) has been described, but there may be two or more functional split points. For example, the plurality of base station functional units may be split and disposed in three unit, which are CU, DU, and radio unit (RU), by two functional split points.

In the configurations of the DL according to the first and second exemplary embodiments, a configuration example has been described in which the subcarrier signal mapped to the radio resources (for example, RE) arranged on a frequency axis is transmitted by the FH, and the slave station device performs inverse fast Fourier transform (IFFT) processing on the subcarrier signal to obtain an orthogonal frequency division multiplexing (OFDM) signal. In other words, in the configurations of the DL according to the first and second exemplary embodiments, in function division between the master station device and the slave station device, the master station device includes a function for performing mapping to the RE, and the slave station device includes a function for performing IFFT processing. With the configuration example based on this function division, the influence of out-of-band radiation due to noise superimposed in the FH can be reduced by the IFFT processing.

In the configurations of the UL according to the first and second exemplary embodiments, the slave station device performs the FFT processing on the OFDM signal to obtain the subcarrier signal and transmits the subcarrier signal through the FH. In the master station device, demapping processing is performed on the transmitted subcarrier signal. In other words, in the configurations of the UL according to the first and second exemplary embodiments, in function division between the master station device and the slave station device, the master station device includes a function for performing demapping processing, and the slave station device includes a function for performing FFT processing. With the configuration example based on this function division, the influence of out-of-band radiation due to noise superimposed in the FH can be reduced by the FFT processing and the demapping processing.

In the first and second exemplary embodiments, the error correction encoding processing for the FH transmission is not performed. However, the error that can occur in the FH transmission may be corrected by the error correction encoding processing for the radio segment (for example, a segment between radio base station 1 and UE 2). The error correction encoding processing for the radio segment is executed by encoder 205 in FIGS. 3A and 7A in the DL, for example. Decoding processing with respect to the error correction encoding processing for the radio segment is performed by decoder 905 in FIGS. 6B and 9B in the UL, for example.

In this case, the error correction encoding processing for the radio segment may be set in accordance with the transmission characteristic in the FH.

For example, the higher the encoding rate (in other words, the lower the redundancy), the higher the transmission efficiency but the lower an error correction capability tends to be. Conversely, the lower the encoding rate (in other words, the higher the redundancy), the lower the transmission efficiency but the higher the error correction capability tends to be.

Therefore, for example, the encoding rate may be set in accordance with the transmission characteristics in the wireless segment and the transmission characteristics in the FH. For example, in the DL, the coding rate used in encoder 205 may be set in accordance with the transmission characteristics in the wireless segment and the transmission characteristics in the FH. Further, in the UL, the encoding rate used in UE 2 may be set in accordance with the transmission characteristics in the wireless segment and the transmission characteristics in the FH. For example, in the UL, radio base station 1 may set the encoding rate used by UE 2 and notify the UE 2 of control information indicating the set encoding rate.

The optical signal transmitted or received in the FH segment may include information about transmission control between the master station device and the slave station device. For example, the error correction encoding processing for the FH transmission may be performed on the information about the transmission control.

In a case of eCPRI, a payload part of the signal includes, for example, a radio transmission signal (for example, a PDSCH or PDCCH signal) that has been subjected to signal processing by the master station device or the slave station device. The "PDSCH" is an abbreviation for "physical downlink shared channel", and the "PDCCH" is an abbreviation for "physical downlink control channel". On the transmission side, the error correction processing is performed on the radio transmission signal.

In the error correction for the payload part of the signal in the master station device for transmission in a radio segment, even if an error occurs in the payload part in the FH transmission segment, the error can be corrected at a radio receiver side (for example, user equipment (UE) in a downlink).

Meanwhile, the header part of the signal may include, for example, information about transmission control between the master station device and the slave station device. For example, the header part may include information about a plurality of destinations corresponding to a plurality of slave station devices.

If an error occurs in the header part, the payload part to which the header part is added may fail to be restored on the receiver side and may be discarded. The header part is therefore more important and is expected to have higher error tolerance than the payload part. Therefore, the error correction encoding processing for the FH transmission may be performed in the header part, and the transmission method in the first and/or second exemplary embodiments described above may be applied to the subcarrier signal corresponding to the payload part without performing the error correction encoding processing for the FH transmission.

The present disclosure can be achieved by software, hardware, or software in conjunction with hardware.

Each functional block used in the description of the above exemplary embodiments may be partially or entirely achieved as a large-scale integration (LSI) which is an integrated circuitry, and each processing described in the above exemplary embodiments may be partially or entirely controlled by one LSI or a combination of LSIs. The LSI may be configured by individual chips, or may be configured by one chip to include some or all of the functional blocks. The LSI may include an input and an output of data. The LSI may be referred to as an integrated circuit (IC), a system LSI, a super LSI, or an ultra LSI depending on the degree of integration.

A circuitry integration method is not limited to the LSI, and may be achieved by a dedicated circuitry, a general-purpose processor, or a dedicated processor. Further, this method may be achieved by using a field programmable gate array (FPGA) that can be programmed after manufacturing of the LSI or a reconfigurable processor in which a connection and setup of circuitry cells inside the LSI can be reconfigured. The present disclosure may be achieved as digital processing or analog processing.

Further, when a circuitry integration technology replacing the LSI appears due to the progress of the semiconductor technology or another derived technology, the functional blocks may be integrated naturally by using the technology. Biotechnology and the like can be used.

SUMMARY OF THE PRESENT DISCLOSURE

A master station device according to one non-limiting example of the present disclosure includes a processor that outputs a subcarrier modulation signal, and a transmitter that maps an I component and a Q component of the subcarrier modulation signal in an optical signal to be transmitted to a fronthaul.

In the master station device according to one non-limiting example of the present disclosure, the transmitter maps the I component and the Q component of the subcarrier modulation signal as an I component and a Q component of the optical signal, respectively.

In the master station device according to one non-limiting example of the present disclosure, the transmitter sets, in the optical signal, a candidate signal point having a predetermined relationship with a signal point represented by the I component and the Q component of the subcarrier modulation signal among a plurality of candidate signal points on an IQ plane of the optical signal.

In the master station device according to one non-limiting example of the present disclosure, the predetermined relationship is a relationship indicating a shortest distance between the candidate signal point and the signal point in the IQ plane.

In the master station device according to one non-limiting example of the present disclosure, the subcarrier modulation signal is a signal mapped to a radio resource in a radio transmission segment, and is subjected to error correction encoding corresponding to the radio transmission segment between the radio transmission segment and an optical transmission segment including the fronthaul.

The master station device according to one non-limiting example of the present disclosure includes a receiver that receives an uplink optical signal via the fronthaul, wherein the processor identifies an uplink subcarrier modulation signal mapped to the uplink optical signal, based on an I component and a Q component of the uplink subcarrier modulation signal.

The slave station device according to one non-limiting example of the present disclosure includes a receiver that receives the optical signal via the fronthaul, and a processor that identifies the subcarrier modulation signal based on the I component and Q component of the subcarrier modulation signal mapped to the optical signal.

In the slave station device according to one non-limiting example of the present disclosure, the processor outputs an uplink subcarrier modulation signal, and a transmitter is provided in which an I component and a Q component of the uplink subcarrier modulation signal is mapped to an uplink optical signal to be transmitted to the fronthaul.

A wireless communication system according to one non-limiting example of the present disclosure includes a master station device and a slave station device. The master station device includes a processor that outputs a subcarrier modulation signal, and a transmitter that maps an I component and a Q component of the subcarrier modulation signal to an optical signal to be transmitted to a fronthaul. The slave station device includes a receiver that receives the optical signal via the fronthaul, and a processor that identifies the subcarrier modulation signal based on the I component and the Q component of the subcarrier modulation signal mapped to the optical signal.

The present disclosure is suitable for, for example, a wireless communication system.

What is claimed is:

1. A master station device comprising:
    a processor which, in operation, outputs a subcarrier modulation signal; and
    a transmitter which, in operation, maps an in-phase (I) component and a quadrature-phase (Q) component of the subcarrier modulation signal to an optical signal to be transmitted to a fronthaul, wherein:
        the subcarrier modulation signal is coded in a first quadrature amplitude modulation scheme having a plurality of signal points,
        the optical signal is coded in a second quadrature amplitude modulation scheme having a plurality of candidate signal points, the second quadrature amplitude modulation scheme having a higher modulation multilevel number than the first quadrature amplitude modulation scheme, and
        the transmitter sets each of the plurality of signal points of the subcarrier modulation signal to a corresponding candidate signal point of the plurality of candidate signal points of the optical signal, a distance from the each of the signal points of the subcarrier modulation signal to the corresponding candidate signal point being a shortest distance in an IQ plane of the optical signal.

2. The master station device according to claim 1, wherein the transmitter maps the I component and the Q component of the subcarrier modulation signal as an I component and a Q component of the optical signal, respectively.

3. The master station device according to claim 1, wherein the subcarrier modulation signal is a signal mapped to a radio resource in a radio transmission segment, and is subjected to error correction encoding corresponding to the radio transmission segment between the radio transmission segment and an optical transmission segment including the fronthaul.

4. The master station device according to claim 1, further comprising a receiver which, in operation, receives an uplink optical signal via the fronthaul,
   wherein the processor identifies an uplink subcarrier modulation signal mapped to the uplink optical signal, based on an I component and a Q component of the uplink subcarrier modulation signal.

5. The master station device according to claim 1, wherein an error correction encoding processing for fronthaul transmission is performed in a header part of the subcarrier modulation signal, and
   the error correction encoding processing for the fronthaul transmission is not performed in a payload part of the subcarrier modulation signal.

6. A slave station device comprising:
   a receiver which, in operation, receives an optical signal via a fronthaul; and
   a processor which, in operation, identifies a subcarrier modulation signal based on an in-phase (I) component and a quadrature-phase (Q) component of the subcarrier modulation signal mapped to the optical signal, wherein:
      the subcarrier modulation signal is coded in a first quadrature amplitude modulation scheme having a plurality of signal points,
      the optical signal is coded in a second quadrature amplitude modulation scheme having a plurality of candidate signal points, the second quadrature amplitude modulation scheme having a higher modulation multilevel number than the first quadrature amplitude modulation scheme, and
      the processor sets each of the plurality of candidate signal points of the optical signal to a corresponding signal point of the plurality of signal points of the subcarrier modulation signal, a distance from the each of the candidate signal points of the optical signal to the corresponding signal point being a shortest distance in an IQ plane of the subcarrier modulation signal.

7. The slave station device according to claim 6, wherein the processor outputs an uplink subcarrier modulation signal, the device comprising a transmitter which, in operation, maps an I component and a Q component of the uplink subcarrier modulation signal to an uplink optical signal to be transmitted to the fronthaul.

8. The slave station device according to claim 6, wherein an error correction encoding processing for fronthaul transmission is performed in a header part of the subcarrier modulation signal, and
   the error correction encoding processing for the fronthaul transmission is not performed in a payload part of the subcarrier modulation signal.

9. A wireless communication system comprising:
   a master station device including
      a processor which, in operation, outputs a subcarrier modulation signal, and
      a transmitter which, in operation, maps an in-phase (I) component and a quadrature-phase (Q) component of the subcarrier modulation signal to an optical signal to be transmitted to a fronthaul, wherein:
         the subcarrier modulation signal is coded in a first quadrature amplitude modulation scheme having a plurality of signal points,
         the optical signal is coded in a second quadrature amplitude modulation scheme having a plurality of candidate signal points, the second quadrature amplitude modulation scheme having a higher modulation multilevel number than the first quadrature amplitude modulation scheme, and
         the transmitter sets each of the plurality of signal points of the subcarrier modulation signal to a corresponding candidate signal point of the plurality of candidate signal points of the optical signal, a distance from the each of the signal points of the subcarrier modulation signal to the corresponding candidate signal point being a shortest distance in an IQ plane of the optical signal; and
   a slave station device including
      a receiver which, in operation, receives the optical signal via the fronthaul, and
      a processor which, in operation, identifies the subcarrier modulation signal based on the I component and the Q component of the subcarrier modulation signal mapped to the optical signal.

10. The wireless communication system according to claim 9, wherein
   an error correction encoding processing for fronthaul transmission is performed in a header part of the subcarrier modulation signal, and
   the error correction encoding processing for the fronthaul transmission is not performed in a payload part of the subcarrier modulation signal.

* * * * *